United States Patent [19]

Garcia et al.

[11] Patent Number: 4,920,744

[45] Date of Patent: May 1, 1990

[54] DUCTED FAN TURBINE ENGINE

[75] Inventors: Alain Garcia, Aussonne; Jean-Claude Tchavdarov, Castelmaurou; Alain Porte, Colomiers, all of France

[73] Assignee: Aerospatiale-Societe Nationale Industrielle, Paris, France

[21] Appl. No.: 267,458

[22] Filed: Nov. 4, 1988

[30] Foreign Application Priority Data

Nov. 6, 1987 [FR] France ................... 87 15434

[51] Int. Cl.$^5$ .............................................. F02K 3/04
[52] U.S. Cl. ................... 60/226.1; 60/39.31; 244/54
[58] Field of Search ............ 60/226.1, 39.31, 262; 244/54; 248/554, 555

[56] References Cited

U.S. PATENT DOCUMENTS

| | | | |
|---|---|---|---|
| 2,863,620 | 12/1958 | Vautier | 244/55 |
| 2,879,959 | 3/1959 | Morrison et al. | 244/129.1 |
| 3,541,794 | 11/1970 | Johnston et al. | 60/39.31 |
| 4,037,809 | 7/1977 | Legrand | 60/226.1 |
| 4,043,522 | 8/1977 | Vetter | 244/54 |
| 4,044,973 | 8/1977 | Moorehead | 244/54 |
| 4,055,041 | 10/1977 | Adamson et al. | 60/226.1 |
| 4,506,850 | 3/1985 | McConnell | |
| 4,585,189 | 4/1986 | Buxton | 244/54 |
| 4,683,717 | 8/1987 | Naud | 60/226.1 |
| 4,825,648 | 5/1989 | Adamson | 60/226.1 |

Primary Examiner—Donald E. Stout
Attorney, Agent, or Firm—Pearne, Gordon, McCoy & Granger

[57] ABSTRACT

Inside a ducted fan turbine engine, especially one with a high or very high bypass dilution ratio, access to the gas generator compartment of the engine is effected by means of two articulated caps (34) with a C-shaped section. The upper edge of each cap (34) is connected to the fixed structure of the jet engine by means of a series of articulated arms (36) and a telescopic link (54) is inserted between the housing of the engine and the bottom of each cap. In a first stage (arrow F1), this mechanism enables the caps (34) to be brought beyond the rear edge of the outer ring (12) of the jet engine, the links (54) being locked in a compressed position. In a second stage, the caps (34) uncoupled from the ring (12) are able to pivot from the desired angle (arrow F2) around an axis (y-y') parallel to the axis (x-x') of the ducted fan turbine engine.

11 Claims, 5 Drawing Sheets

DUCTED FAN TURBINE ENGINE

FIELD OF THE INVENTION

The invention relates to a ducted fan turbine engine equipped with caps whose new design allows for access to be gained in suitable conditions to the gas generator compartment of the engine and to the items of equipment installed in said compartment, without disturbing the air flows and adversely affecting the aerodynamic performances of the jet engine.

BACKGROUND OF THE INVENTION

In existing ducted fan turbine engines, various solutions are proposed for gaining access to the gas generator of the engine.

One first known solution, shown in particular by the document US-A-4 585 189, consists of joining on each side of the strut supporting the engine two hollow caps with a section in the form of half-rings whose internal volume, when said caps are closed, delimits the fan duct.

The advantage of this solution is of procuring excellent access to the entire environment of the engine. However, the half-caps are heavy and complex with the result that the joints of these half-caps must have a high mechanical resistance and their handling requires that resort be made to using hydraulic systems. Moreover, the links between the caps and the fixed parts are complex to embody. Finally, the particular shape of the half-caps results in disturbing the aerodynamic behavior of the top and bottom parts of the turbine engine, which in particular provokes interference drags, leaks and performance losses.

These drawbacks, already significant for engines with a high bypass dilution ratio (4 to 6), become primordial for engines with a very high bypass dilution ratio (between 10 and 20) owing to large fan diameters and their low compression ratio.

Furthermore and known in particular via the document FR-A-2 291 091, there exist ducted fan turbine engines in which access to the gas generator compartment of the engine is effected by caps having a C-shaped section.

With respect to the foregoing, this solution has the advantage of using lighter caps with a less complex shape and which can be handled without resorting to using hydraulic systems. Moreover, the aerodynamic performances are improved compared with those cases when the previously-mentioned complex caps are used. However, opening of the caps is limited by the outer ring of the fan pipe and access to the front part of the gas generator is rendered extremely difficult. As regards the document cited, this even requires that the boat be disassembled.

Finally, a further known solution for gaining access to the gas generator of the engine consists of using non-articulated hanging caps appearing in the form of panels or movable doors.

With respect to the foregoing, this solution has the advantage of enabling especially simple light caps to be used. However, the handling of such caps is random (depending on the weight, dimensions and accessibility) and may involve a long process. Moreover, the caps risk being damaged on the floor and may even be lost. In addition, the large number of mobile parts (joint, etc) results in aerodynamic losses and access to the front part of the gas generator compartment is rendered difficult.

SUMMARY OF THE INVENTION

The specific object of the invention is to provide a ducted fan turbine engine equipped with a number of a new type of cap allowing for access to be gained simply, reliably and quickly to the gas generator of the engine, without it being necessary to resort to using hydraulic systems and without the air flow and the aerodynamic performances of the jet engine being significantly adversely affected According to the invention, this result is obtained by using a ducted fan turbine engine comprising a central engine provided with a housing surrounded by an annular gas generator compartment externally delimited by an intermediate ring and a fan duct delimited between the intermediate ring and an external ring, the intermediate ring comprising two articulated caps with a C-shaped section allowing for access to be gained to the central engine, wherein each of the caps is joined onto the housing of the engine by a mechanism enabling this cap to be displaced between a closed position, namely a rear intermediate position in which the entire cap is located beyond the rear edge of the external ring, and an open position.

By using the mechanism thus defined, opening of the caps is effected twice, which allows for the use of single and light caps, whilst at the same time ensuring easy access to the gas generator compartment of the engine and without significantly adversely affecting the aerodynamism of the ducted fan turbine engine.

In one preferred embodiment of the invention, each mechanism comprises at least two axially spaced arms, one extremity of each arm being joined onto a beam integral with the housing and extending parallel to a longitudinal axis of the ducted fan turbine engine around a first axis orthogonal to this axis, the opposite extremity of each arm being joined onto an intermediate part by a second axis parallel to the first one, this intermediate part itself being joined onto the cap close to a first extremity of the C-shaped section formed by the latter by means of a third axis parallel to said longitudinal axis.

So as to ensure that the caps do not move axially towards their closed position when passing between the rear intermediate position and the open position, each mechanism preferably also includes a locking device mounted on said beam and on which is an elastic device serving to keep the locking device in a position automatically ensuring blocking of one of the arms in the rear intermediate position and in the open position of the cap.

So as to control the deployment of the caps from their rear intermediate position as far as their open position, each mechanism in addition comprises at least one telescopic link whose extremities are respectively joined onto the housing of the engine and the cap close to the second extremity of the C formed into a section by the latter, each extremity of the link being articulated around two orthogonal axes, one of which being parallel to the longitudinal axis of the ducted fan turbine engine and the others being parallel to one another.

So as to avoid deployment of the caps at the time of passing between the closed position and the rear intermediate position and so as to enable the caps to be kept in the open position to provide maintenance, the telescopic link includes locking means suitable for preventing any varying of the length of the link when the latter has a minimum length determining the closed position and the rear intermediate position and when the link has at least one other length greater than the minimum length determining the open position.

Preferably, the first extremity of the C-shaped section formed by each cap is the upper extremity of the latter.

BRIEF DESCRIPTION OF THE DRAWINGS

There now follows a description of one preferred embodiment of the invention, given by way of example in no way restrictive, and by referring to the annexed drawings in which.

DETAILED DESCRIPTION OF THE PREFERRED EMBODIMENTS

Figure 1:
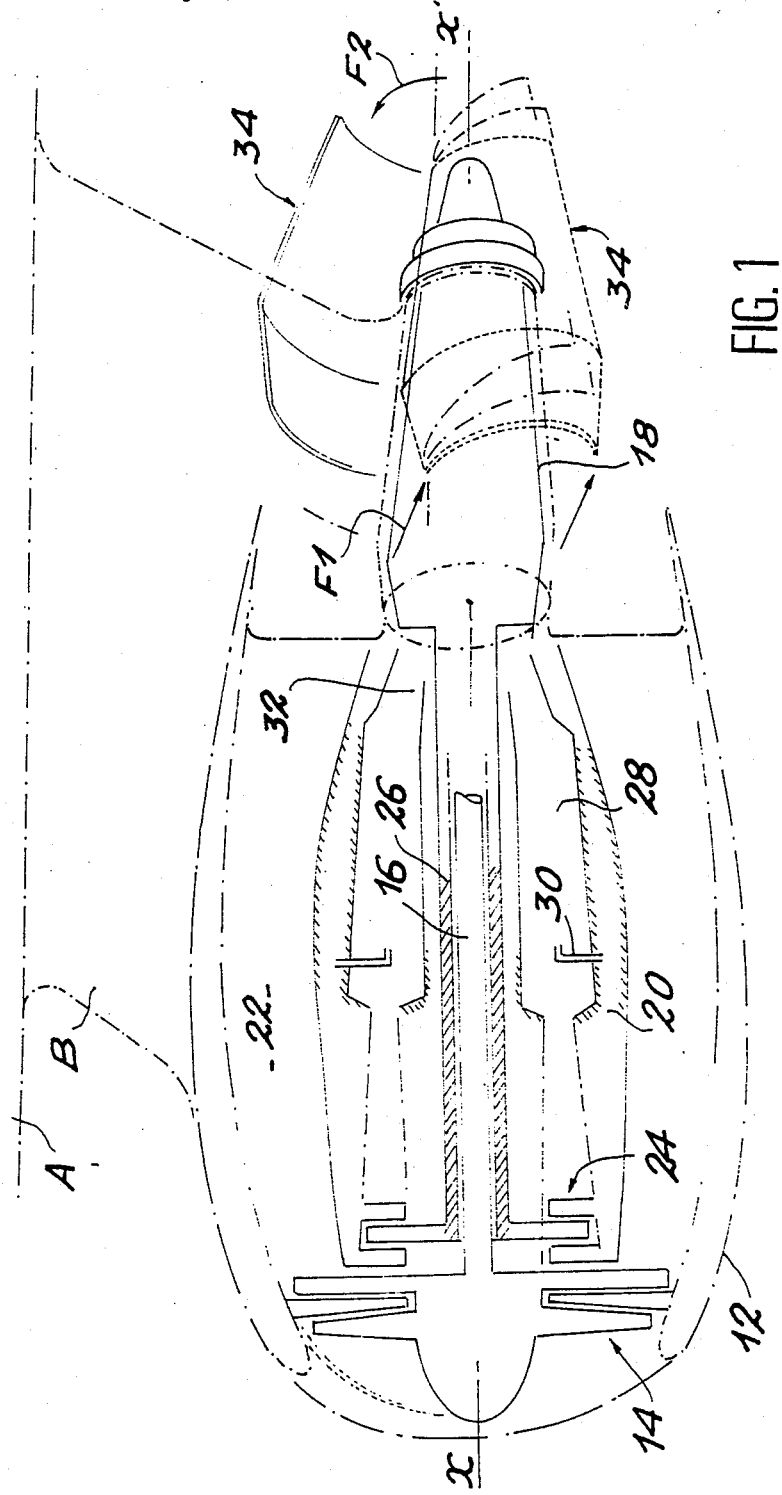
FIG. 1 is a diagrammatic partial longitudinal cutaway side view of a ducted fan turbine engine according to the invention.

On FIG. 1, the reference A denotes one part of the wing of an aeroplane. A ducted fan turbine engine, denoted generally by the reference 10, is boat-mounted below the wing A by means of a raised strut B orientated according to the horizontal axis x—x' of the ducted fan turbine engine.

More precisely and also non-restrictively, the ducted fan turbine engine shown on FIG. 1 is an engine of the front fan type. It is known to comprise an outer ring 12 centered on the axis x—x' and constitutes the boat of the jet engine. A fan 14 is housed at the input of the ring 12. The rotor of the fan 14 is connected by a central shaft 16 to the low pressure turbine of an engine 18 housed at the output of an intermediate ring 20 disposed coaxially inside the outer ring 12 at the back of the fan 14. A product 22 is thus formed between the rings 12 and 20. A compressor 24 is mounted inside the intermediate ring 20 immediately behind the fan 14. The rotor of this compressor 24 is driven by the high pressure turbine of the engine 18 by means of a hollow shaft 26 encompassing the central shaft 16. The space delimited between the compressor 24 and the engine 18 inside the intermediate ring 20 constitutes the combustion chamber 28 of the turbocompressor in which the fuel injectors 30 open. At the back of the combustion chamber 28, the annular space delimited between the engine 18 and the rear of the intermediate ring 20 constitutes the gas generator compartment 32.

The structure just described briefly is conventional and its functioning is well-known by specialists. It is also known that the fixed elements constituted by the outer ring 12, the intermediate ring 20 and the housing of the engine 18 are secured to the strut B.

In a jet engine of this type, it is essential to be able to gain access to the gas generator compartment 32 formed between the housing of the engine 18 and the rear part of the intermediate ring 20. In order to achieve this, the invention proposes an original solution which shall now be described in detail with reference to FIGS. 2 to 4.

In its rear part encompassing the engine 18, the intermediate ring 20 includes on both sides of the strut B two caps 34 having as a section perpendicular to the axis x—x' of the jet engine the shape of a C or a semi-circle. The caps 34 extend along the whole length of the engine 18, in other words, when they are closed, their front extremity being situated inside the outer ring 12, whereas their rear extremity is close to the rear of the turbojet. engine. The two caps 34 are perfectly symmetrical with respect to a vertical plane passing through the axis x—x'.

According to the invention, the link between the strut B and each of the caps 34 is provided by a mechanism via which the deployment of the caps is effected twice.

Figure 2:
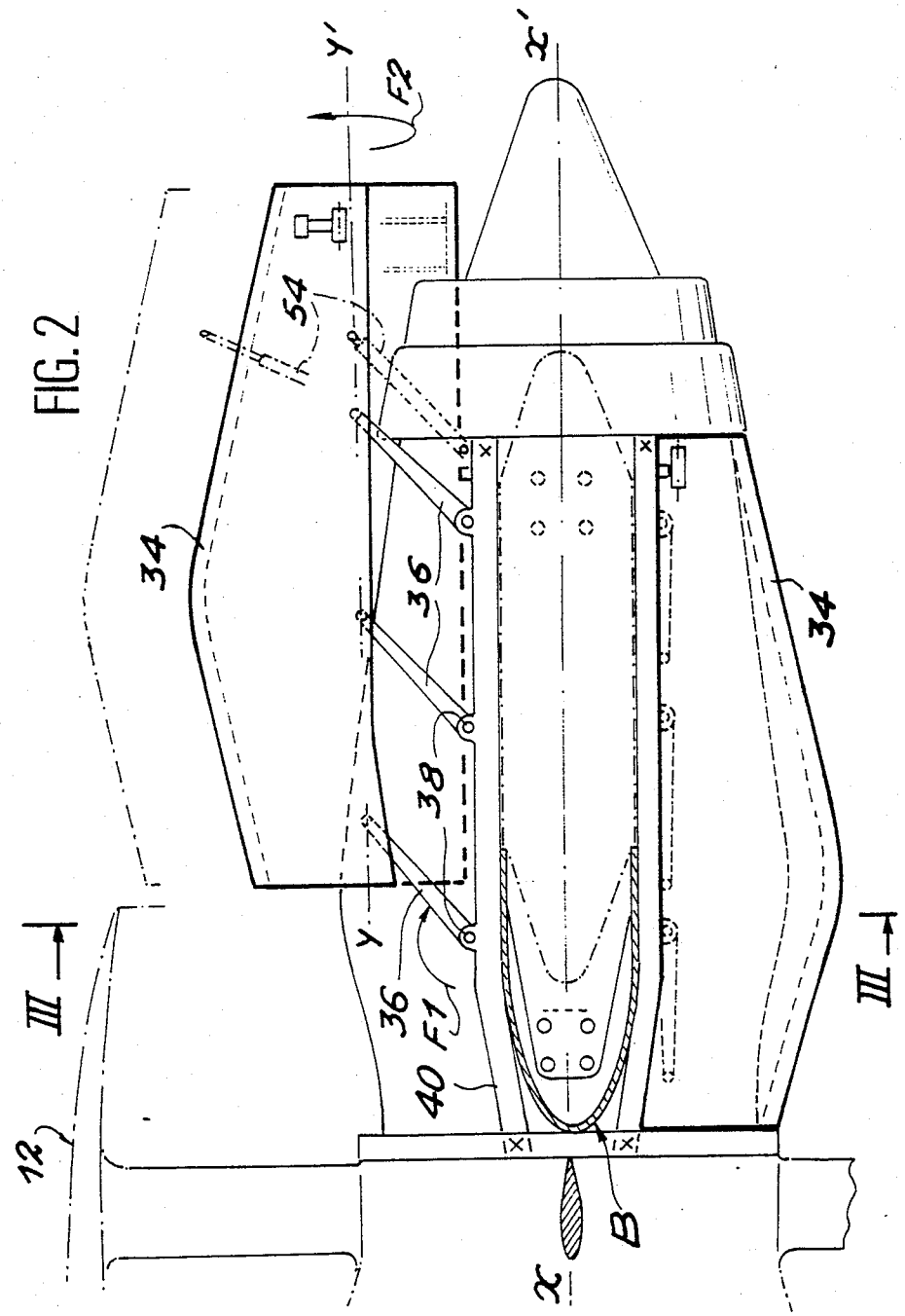
FIG. 2 is a top partial cutaway view showing on a larger scale the rear extremity of the ducted fan turbine engine of FIG. 1, the caps being shown in different positions.
Figure 3:
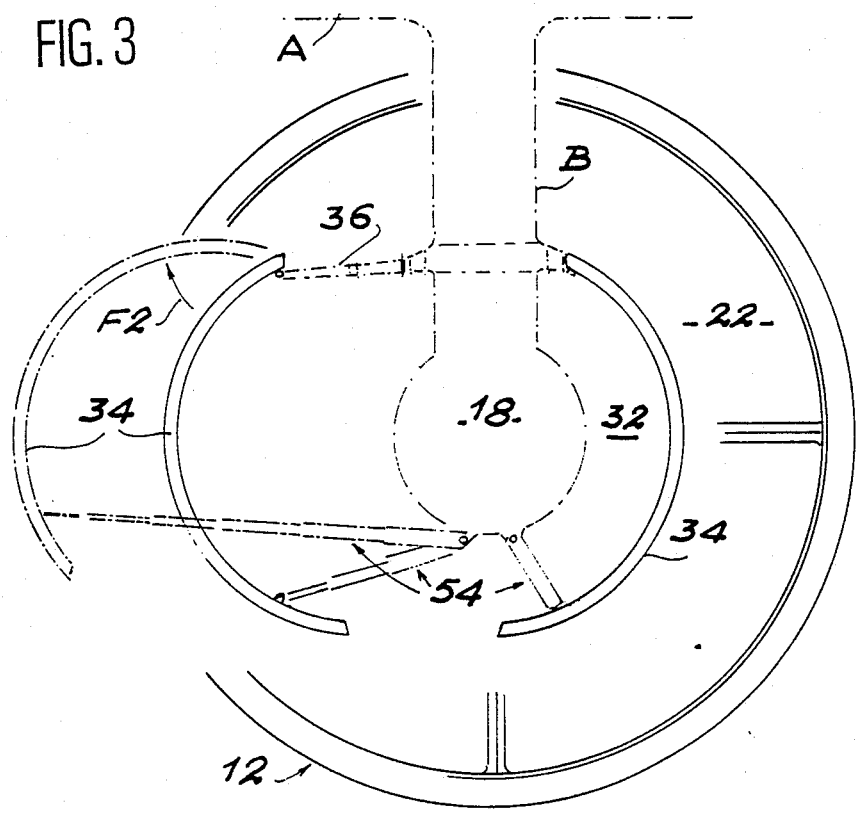
FIG. 3 is a cutaway view along the line III—III of FIG. 2 on which the caps are shown in different positions.

This mechanism, in a first stage (arrow F1), allows for a displacement towards the rear of each of these caps from a closed position, as shown at the bottom on FIG. 2 and on the right on FIG. 3 to a rear intermediate position as shown by the full lines on the upper part of FIG. 2 and on the left part of FIG. 3. In this rear intermediate position, the cap 34 is fully situated beyond the transversal plane passing through the rear edge of the outer ring 12. In a second stage (arrow F2) and as shown in particular in the left half of FIG. 3, each of the caps 34 pivots around an axis y—y' parallel to the axis x—x' of the jet engine, this axis y—y' being situated in the proximity of the edge of the upper extremity of the C sectionally formed by the cap. Given the fact that the caps 34 are then completely freed from the outer crown 12, their pivoting around the axis y—y' is not limited and it is thus possible to bring the cap into an open position shown by the mixed lines on FIGS. 2 and 3 and making it possible to easily gain access to the gas generator compartment 32 of the engine.

In the mode of embodiment shown, the mechanism, making it possible to embody deployment each of the caps two times, includes a series of articulated arms 36 regularly spaced from the axis x—x' of the jet engine.

Figure 5:
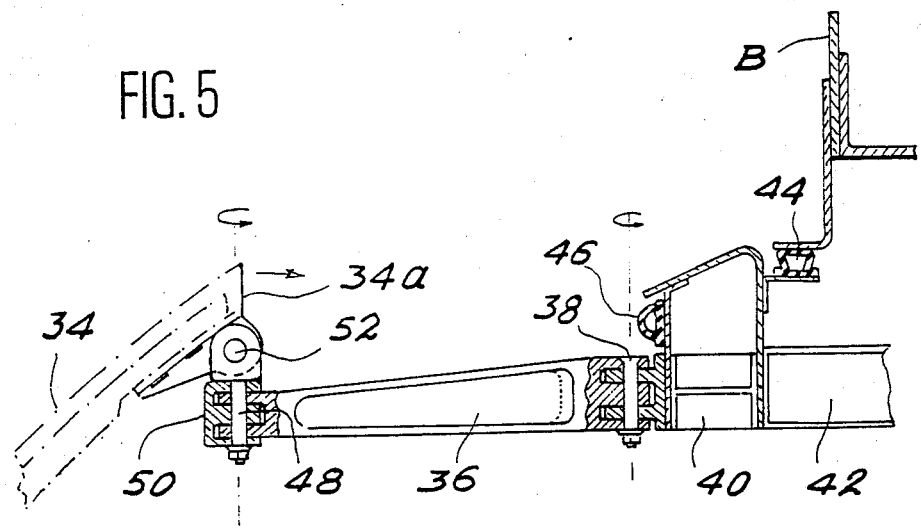
FIG. 5 is a cross-sectional view of the jet engine showing on a larger scale one of the arms by which each cap is joined onto a beam integral with the housing of the engine.
Figure 6:
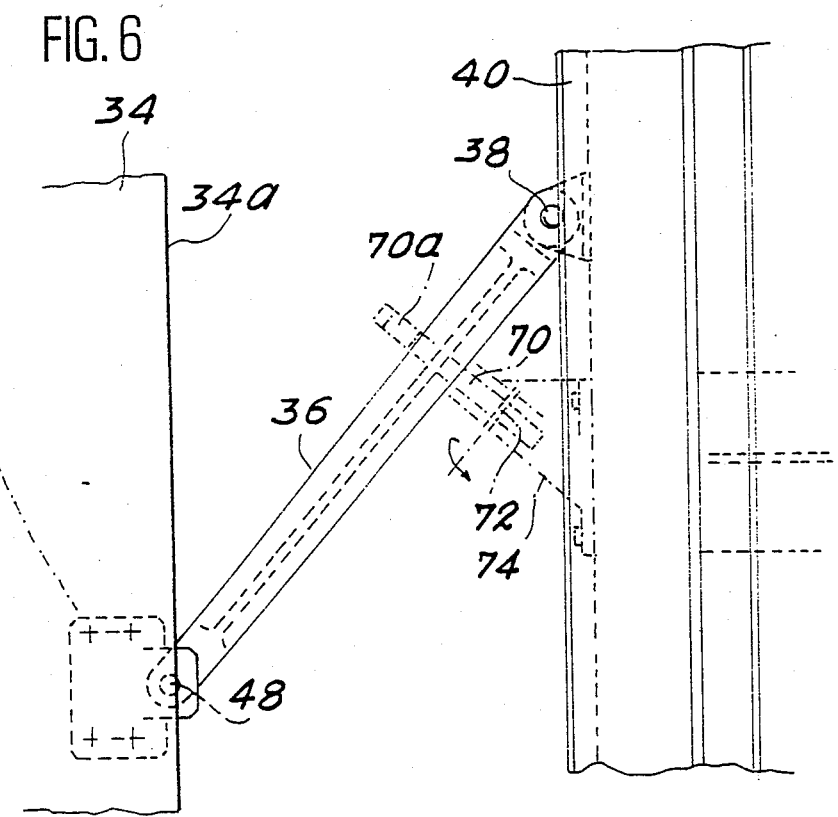
FIG. 6 is a top view of the arm of FIG. 5.

As shown in more detail on FIGS. 5 and 6, a first extremity of each of the arms 36 is linked by a vertical spindle 38 onto a horizontal beam 40 extending parallel to the axis x—x' over most of its length. The two lateral beams 40 are secured to the support strut B of the jet engine on both sides of this strut. They are interconnected by transversal spars 42 so as to ensure continuity of the transmission of circumferential forces when the caps are closed. The assembly formed by the two beams 40 and the spars 42 is linked isostatically to the housing of the engine.

Imperviousness between each of the beams 40 and the strut B is ensured by a sealing joint 44 extending over the entire length of the beam. Each of the beams 40 also carries on its outer face a second sealing joint 46 against which the upper edge 43a of the corresponding cap 34 comes to take sealed support when said cap is closed.

The opposite extremity of each of the arms 36 is joined by means of a spindle 48, also vertical, onto a linking part 50. This linking part 50 itself is joined to the upper extremity of the corresponding cap 34 by a spindle 52 parallel to the axis x—x' of the jet engine. The spindles 52 of all the arms 36 supporting a given cap 34 are aligned so as to materialize the axis y—y' of this cap.

As the arms 36 have the same length, the three arms 36 by which each cap 34 is connected to the corresponding beam 40 form with their spindles 38 and 48 ductile parallelograms making it possible to move each cap 34 from its closed position shown on the lower half of FIG. 2 into its rear intermediate position shown by the full lines on the upper half of FIG. 2 (arrow F1). Of course, the arms also make it possible to carry out the opposite movement at the time the caps are folded up.

So as to ensure that the caps 34 do not pivot around the spindles 52 thereby utilizing the axis y—y' in the first phase for opening the caps 34 which has just been described, the mechanism connecting each of the caps 34 to the strut B and the housing of the engine 18 also includes a telescopic link 54 for each of the caps 34. The implantation of the links 54 is shown by the FIGS. 2 and 3 and one of these links is shown in detail on FIG. 7.

The telescopic links 54 are preferably situated inside the proximity of the rear extremity of the caps 34, as shown by FIG. 2, so as to not impede access to the gas generator compartment encompassing the engine. They connect the lower part of the housing 18a of the engine 18 to the lower part of the corresponding cap 34, as shown on FIG. 3.

Figure 7:
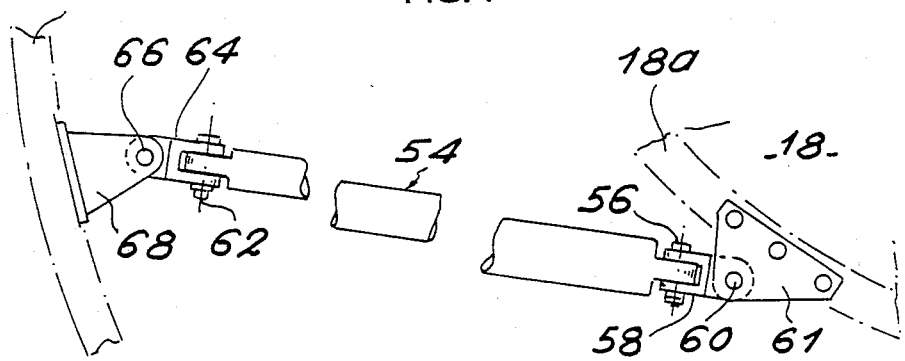
FIG. 7 shows fractionally a cross sectional view with respect to the axis of the jet engine the telescopic link connecting one of the caps to the housing of the engine.

More precisely, it can be seen on FIG. 7 that one of the extremities of each of the telescopic links 54 is joined by means of a spindle 56 orthogonal to the axis x—x' of the jet engine onto an intermediate part 58. This part 58 itself is joined via a spindle 60 parallel to the axis x—x' onto a joint 61 secured to the housing 18a of the engine 18.

The opposite extremity of each telescopic link 54 is joined by means of a spindle 62 parallel to the spindle 56 onto an intermediate part 64, itself joined by a spindle 66 parallel to the axis x—x' of the jet engine onto a joint 68 fixed inside the corresponding cap 34 close to the lower extremity of the latter.

The joints formed by the spindles 56, 60, 62 and 66 between the telescopic link 54, the housing of the engine 18 and the cap 34 make it possible to avoid impeding the movements of said cap authorized by the arms 36.

Each of the telescopic links 54 comprises suitable means (not shown) to prevent any length variation of the link when said link is retracted to the maximum, as well as for different opening angles of the cap by pivoting around the axis y—y'.

When the links 54 are locked in their compressed position, the length of these links is approximately the same as that of the arms 36. This locking corresponds to the closed position of the caps 34, as shown on the right on FIG. 3 and at the bottom on FIG. 2. It also makes it possible to avoid pivoting of the caps around the axis y—y' when the latter are moved between their rest position and their rear intermediate position shown by the full lines on the left half of FIG. 3 and on the top half of FIG. 2.

When the caps 34 are found in this rear intermediate position, the unlocking of the links 54 makes it possible to make the caps 34 pivot around the axes y—y' materialized by the spindles 52 so as to open these caps at the desired angle, which may, for example, be 30°, 45° or 60°. When this angle is reached, the means to prevent any length variation of the links 54 are again activated so as to ensure that the caps are kept in the open position during maintenance operations.

In practice, the locking means associated with the links 54 may be constituted by any suitable device, such as seal screws preventing any relative displacement between the various segments constituting the links. These locking means may also be constituted by blocking keys penetrating into holes corresponding to the smallest length of the link and to different opening degrees of the caps.

Similarly and so that the links 54 are able to avoid any pivoting of the caps 34 around the axes y—y' before the caps arrive at their rear intermediate position shown by the full lines on the left half of FIG. 3 and on the upper part of FIG. 2, means are also provided to prevent any pivoting of the arms 36 around the spindles 38 when the cap occupies this rear intermediate position so as to allow for its pivoting around the axis y—y'.

Figure 8:
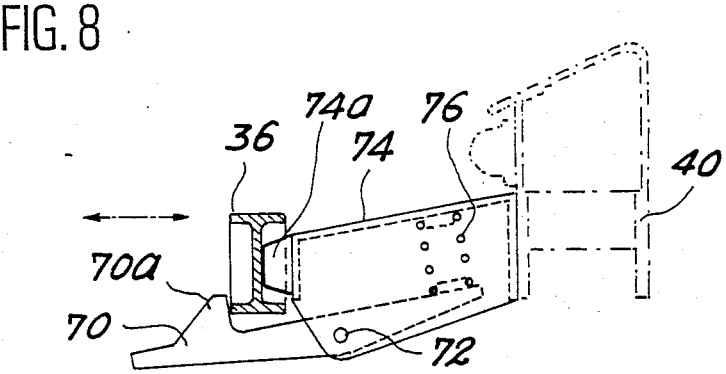
FIG. 8 is a cross-sectional view showing the locking system ensuring that the caps are not folded back towards their closed position after they have been brought into their rear intermediate position.

As shown by FIGS. 6 and 8, these means to prevent pivoting of the arms 36 include a locking lever 70 pivoting-mounted on a joint 74 secured to the outer face of the corresponding beam 40 by means of a spindle 72. This spindle 72 is orthogonal to the vertical spindles 38 and 48 and is parallel to the arms 36 when the cap 34 they support is in the rear intermediate position, as shown on FIG. 6. A compression spring 76 is inserted between the joint 74 and the extremity of the locking lever 70 nearest the beam 40 so as to stress towards the top the extremity opposite the lever 70. A stop (not shown) limits displacement of this final extremity of the lever 70 towards the top.

The extremity of the lever 70 furthest from the beam 40 bears on its upper face a locking finger 70a whose edge turned towards the exterior forms a ramp. One of the arms 36 bearing the corresponding cap 34 comes into contact with this ramp at the end of the first phase for deploying the cap (arrow F1 on FIG. 2), namely when the cap arrives at its rear intermediate position. The purpose of the cooperation of the arm 36 with this ramp is to progressively zeroize the finger 70a by pivoting of the lever 70 against the action of the spring 76 until the arm 36 is housed behind the finger 70a, as shown on FIGS. 6 and 8.

In this position, the arm 36 is in support against an elastomer stop 74a borne by the joint 74 and against the rear edge of the finger 70a, so that any pivoting of this arm around its spindle 38 becomes impossible. As long as no action is carried out on the locking lever 70, the corresponding cap 34 thus remains totally situated beyond the rear edge of the outer ring 12 of the turbo jet engine and it may be opened by pivoting around its axis y—y' with the desired angle, without this opening being impeded by the outer ring 12 of the jet engine.

When the operator wishes to reclose the cap 34, he acts manually on the outer extremity of the lever 70 against the spring 76 so as to free the corresponding arm of the finger 70a. The cap 34 may then be folded from its rear intermediate position to its closed position by pivoting around the spindles 38 and 48.

Figure 4:
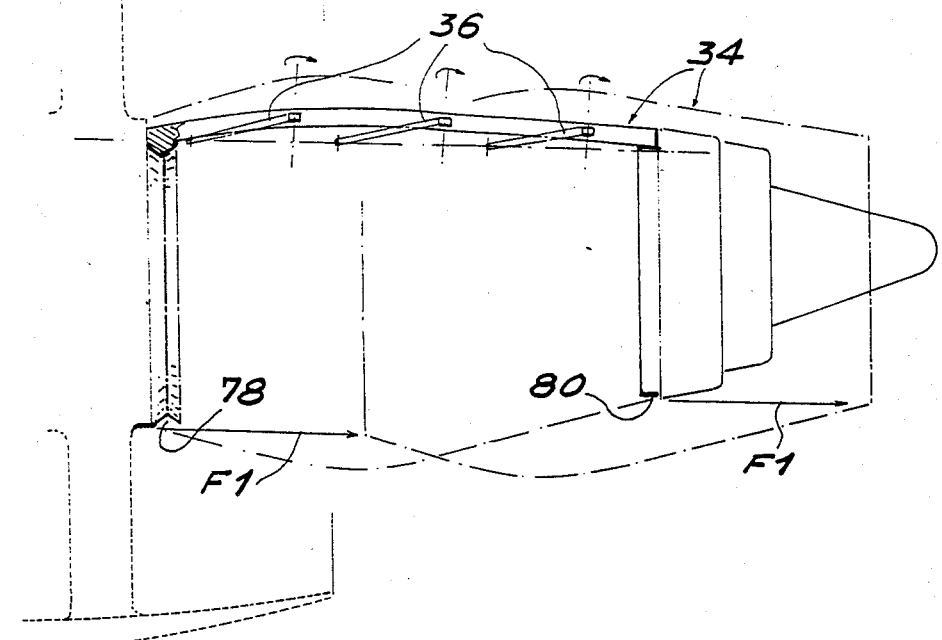
FIG. 4 is a diagrammatic side view of the part of the ducted fan turbine engine shown on FIG. 2.

As shown in particular on FIG. 4, when the caps 34 are folded back, they are centered at the front by a circumferential groove with a V section formed on the housing of the engine 18 and at the rear by a cylindrical support surface 80, also formed on the housing of the engine.

Bolts are inserted firstly between the upper extremity of each cap 34 and the corresponding beam 40 and secondly between the lower extremities of the two caps 34 so as to ensure anchoring of the latter in the folded back position during the flight. These bolts may possibly be remote-controlled. They guarantee imperviousness by ensuring crushing of the joints 46. They also allow for the circumferential looping of flight forces through the support structure integral with the engine and constituted by the beams 40 and the spars 42.

Preferably, a second telescopic link is joined and stored on each of the caps 34 so as to ensure that these caps are kept in the open position and prevent them returning to the closing position.

When an operator desires to open the caps in order to gain access to the gas generator compartment 32 of the engine, it annuls the action of the previously described bolts and deploys the two caps 34 towards the rear by pulling them into the proximity of the telescopic links 54 until one of the arms 36 supporting each of the caps takes support on the corresponding stop 74a. Automatic locking is then ensured by the levers 70. During this first phase for deploying the caps, the telescoPic links 54 are blocked in the compressed position, which avoids any pivoting of the caps around their axis y—y'.

After unlocking of the telescopic links 54, each cap 34 may then be opened as far as the desired opening position (30°, 45°, 60°, etc) by pivoting around the axis y—y'. This position is maintained by locking of the links 54. The second safety link is then put in place and maintenance operations can be carried out.

In order to reclose the caps 34, the same operations are carried out in reverse order.

The principle for opening the caps just described makes it possible to ensure that total access is gained to the entire gas generator compartment of the engine, whilst having resort to two caps in one single part, said caps being both plain and light and procure sound aerodynamic performances. Moreover, the handling of these caps is rapid and may be effected by a single person without resorting to using a hydraulic system. Finally, the opening of the caps is not limited, since this may be carried out when the caps are completely freed from the outer ring of the turbine jet engine.

Of course, the invention is not merely restricted to the above-described embodiment, but covers all possible variants of the invention.

Thus, instead of using bolts for blocking the caps against the beams supporting them in the closed position, it is possible to use hooks integral with the cap. In this case, the deployment of the caps between the closed position and the rear intermediate position includes a first phase for pivoting these caps around their axis y—y', for example with an angle of about 15°.

As a variant, the beams bearing the caps by means of the articulated arms may also be integral with the strut. The caps then remain hooked to the latter at the time of removal of the engine.

The orthogonal spindles 48 and 52 by which the Caps are joined to the arms 36 may be replaced by any equivalent mechanism, such as pot type joints. The same applies to orthogonal axes connecting the links 54 to the housing of the engine and to the caps.

The invention may be applied to any ducted fan turbine engine and especially to turbojet engines with a high or extremely high bypass dilution ratio.

What is claimed is:

1. A ducted fan turbine engine comprising a central engine provided with a housing encompassed by a gas generator compartment externally delimited by an intermediate ring, a fan duct delimited between the intermediate ring and an outer ring, the intermediate ring comprising two articulated caps with a C-shaped section allowing for access to be gained to the central engine, and means for moving said caps, wherein each of said caps is connected to the housing of the engine by said moving means so that each of said caps can be displaced between a closed position whereby a front end portion of said cap is located within said outer ring, and a rear intermediate position whereby said cap is fully displaced beyond a rear edge of said outer ring, each of said caps being mounted on said moving means so that said caps can be rotated between said rear intermediate position and an open position, said caps being rotated about an axis substantially parallel to a longitudinal axis o the ducted fan turbine engine.

2. A ducted fan turbine engine according to claim 1, wherein a movable safety telescopic link is provided for being placed between each cap and the housing of the engine when the cap is in the open position.

3. A ducted fan turbine engine according to claim 1, wherein the housing of the engine comprises a circumferential groove with a V-shaped section on which the front extremity of each cap is centered, and a cylindrical support surface on which the rear extremity of each cap is centered when the caps are in the closed position.

4. A ducted fan turbine engine comprising a central engine provided with a housing encompassed by a gas generator compartment externally delimited by an intermediate ring and fan duct delimited between the intermediate ring and an outer ring, the intermediate ring comprising two articulated caps with a C-shaped section allowing for access to be gained to the central engine, wherein each of the caps is joined onto the housing of the engine by means of a mechanism allowing this cap to move between a closed position, a rear intermediate position in which the cap is fully situated beyond a rear edge of the outer ring, and an open position, each mechanism including at least two axially spaced arms, one extremity of each arm being joined onto a beam integral with the housing and extending parallel to a longitudinal axis of the ducted fan turbine engine around a first spindle orthogonal to this axis, the opposite extremity of each arm being joined onto an intermediate part by a second spindle parallel to the first spindle, this intermediate part itself being joined onto the cap in the proximity of a first extremity of the C formed into a section by the latter by a third spindle parallel to said longitudinal axis.

5. A ducted fan turbine engine according to claim 4, wherein each mechanism also comprises a locking device mounted on said beam and on which is an elastic device serving to keep the locking device in a position automatically ensuring blocking of one of the arms in the rear intermediate position and in the open position of the cap.

6. A ducted fan turbine engine according to claim 4, wherein each mechanism comprises at least one telescopic link whose extremities are respectively joined onto the housing of the engine and the cap in the proximity of the second C formed into a section by the latter, each extremity of the link being articulated around two orthogonal spindles, one of which is parallel to the longitudinal axis of the ducted fan turbine engine and the other spindles are parallel to each other.

7. A ducted fan turbine engine according to claim 6, wherein each telescopic link comprises locking means suitable for preventing any variation of the length of the link when the latter has a minimum length determining the closed position and rear intermediate position and when the link has at least one other length greater than the minimum length determining the open position.

8. A ducted fan turbine engine according to claim 4, wherein each longitidunal beam bears a joint on which one edge of the cap takes sealed support delimiting said first extremity of the C formed into a section by the latter when the cap is in the closed position.

9. A ducted fan turbine engine according to claim 4, wherein bolts are provided to connect each cap to the beam where this cap is mounted when said cap is in the closed position.

10. A ducted fan turbine engine according to claim 4, wherein bolts are provided to connect between them the caps in the closed position, these bolts being placed between the second extremities of the C formed into a section by the caps.

11. A ducted fan turbine engine according to claim 4, wherein said first extremity of the C formed into a section by each cap is the upper extremity of the latter.

* * * * *

UNITED STATES PATENT AND TRADEMARK OFFICE
CERTIFICATE OF CORRECTION

PATENT NO. : 4,920,744

DATED : May 1, 1990

INVENTOR(S) : Garcia et al.

It is certified that error appears in the above-identified patent and that said Letters Patent is hereby corrected as shown below:

Column 3, line 58, delete "product" and insert --fan duct--.

Column 4, line 33, after "FIG. 3" insert --,--.

Column 7, line 25, delete "telescoPic" and insert --telescopic--.

Column 7, line 61, delete "Caps" and insert --caps--.

Column 8, line 20, delete "axis o the" and insert --axis of the--.

Signed and Sealed this

Sixth Day of August, 1991

Attest:

HARRY F. MANBECK, JR.

*Attesting Officer*    *Commissioner of Patents and Trademarks*